Patented Jan. 7, 1947

2,413,893

UNITED STATES PATENT OFFICE 2,413,893

COPOLYMERIZATION OF INDENES AND PIPERYLENE

Frank J. Soday, Baton Rouge, La., assignor to The United Gas Improvement Company, a corporation of Pennsylvania No Drawing. Application May 17, 1943, Serial No. 487,340

9 Claims. (Cl. 260—93)

This invention relates to a new composition of matter and a method for its preparation.

More particularly, this invention pertains to resins resulting from reacting indene with piperylene.

It is an object of this invention to provide a new type of synthetic resin. It is a further object of this invention to provide resins having utility in many industrial fields, such as in the liquid coating composition fields.

More particularly, it is an object of this invention to provide varnish and lacquer resins possessing excellent alkali, acid, and water resistant properties.

A still further object of the invention is to provide resins compatible with a wide variety of additive agents such as fillers, decorative constituents, pigments, softening agents, plasticizers, and the like.

Another object of the invention is to provide a process for preparing resins of the above character.

Still other objects will become apparent to those skilled in the art from the following description and illustrative examples.

This invention is based upon the discovery that new synthetic resins having highly desirable properties may be prepared by the reaction of indene with piperlylene.

The piperylene employed in the preparation of my new resins may be obtained from any suitable source. For instance, it may be obtained by a variety of synthetic methods, or it may be obtained by the fractionation of condensates obtained in the manufacture of carburetted water gas, oil gas, refinery gas, or coke oven gas, or from similar sources. Such fractions will be referred to herein generally as light oil piperylene fractions. Fractions obtained in the manufacture of oil gas are particularly preferred.

Hydrocarbon fractions containing from 5 to 100% of piperylene may be successfully used in the production of the herein described resinous copolymers, although in general, the use of fractions containing from 50 to 100% piperylene is preferred for the production of resins of high quality.

Light oil piperylene fractions boiling mainly in the range of 37 to 50° C., and more particularly in the range of 38 to 45° C., are preferred.

Fractions in which piperylene is the only diolefine present are preferred, although fractions containing a lesser quantity of butadiene, cyclopentadiene or isoprene, or any combination of two or more of these, or similar materials may be employed without departing from the broad concept of the invention.

Olefines may be present with or without the presence of diolefines other than piperylene, such as olefines having 5 carbon atoms, providing piperylene represents the preponderating unsaturation present. By "olefine" it is intended to mean any one of a group of hydrocarbons having the formula $C_nH_{2n}$.

The indene employed in the production of my new resins may be obtained from any suitable source, and may be in the form of pure or commercially or technically pure indene, or in the form of a solution or a fraction such as obtained from light oil or a mixture of light oil hydrocarbons. The source of light oil may be the same as in the case of piperylene.

Indene fractions obtained by the distillation of light oil and boiling mainly in the range of 175 to 200° C. may be employed in the preparation of my indene-piperylene resins. Resins having especially desirable properties are obtained when employing indene fractions having boiling ranges between 175 to 190° C. Even more desirable properties are secured in the final resins when the indene fractions have boiling ranges between 178 to 185° C.

While coal tar indene fractions may be employed in the practice of my invention, I greatly prefer to employ indene fractions resulting from the pyrolysis of petroleum as such fractions are substantially free from coumarone.

Light oil indene fractions frequently contain impurities, such as dicyclopentadiene, which are preferably removed prior to the use of the said fraction in my process. This may be accomplished, among other ways, by heating and/or refluxing the fraction to convert the dicyclopentadiene to cyclopentadiene followed by the separation of the cyclopentadiene thus formed from the indene fraction.

Other refining methods which may be employed include treatment with acid or alkaline reagents, as disclosed in my patents, Nos. 2,230,274; 2,228,788; 2,228,789; 2,228,790; 2,228,791; 2,249,793; and 2,257,078.

My new resins may be prepared in many desirable color combinations. Color may be obtained either naturally or artificially. Natural colors may be secured by varying the source and quality of either the indene or the piperylene, or both. Either plain or mottled color combinations may be thus obtained.

Artificial colors and color combinations may be produced through the addition to my new resins of suitable chemical compounds.

Coloring materials, such as organic dyes, inorganic dyes, pigments, and lakes, may be added to any one or more of the reactants, or to the reaction mixture at any stage, but preferably prior to complete polymerization.

As a rule, organic dyes and other organic coloring bodies produce resins with pastel shades.

The coloring compound may, if desired, be added to the mixture of indene and piperylene prior to polymerization, or at any stage of the polymerizing reaction.

If desired, the coloring material itself may be prepared in situ by adding the necessary materials to the polymerization reaction.

As an example, a short list of suitable coloring materials is given in the following table.

TABLE 1

| Color | Dye group |
|---|---|
| Orange | Mono azo. |
| Yellow | Do. |
| Green | Triphenylmethane. |
| Heliotrope | Triphenylmethane pyronine. |
| Red | Pyronine. |
| Black | Diphenylamine. |

Mottled effects may be obtained by adding coloring material to the polymerization mass at a stage in the polymerization reaction after which thorough stirring is no longer required.

Attention is directed to the fact that certain coloring materials may also act as catalysts or as inhibitors to the polymerization reaction. Accordingly, coloring materials should be selected as to (1) their inertness, (2) their action as catalysts, and (3) their action as inhibitors in order to obtain the desired result. In this connection, inhibitors may be employed to retard an otherwise too hasty reaction.

A proper choice of polymerization conditions will enable almost any type of coloring material to be used.

In addition to coloring materials, other additives may be incorporated, such as fillers, of which asbestos, mica, wood flour, cotton linters, and fabric waste are examples.

A decorative filler functioning very much on the order of a coloring material may be added, with or without other coloring matter. Examples of decorative fillers are pearl essence, flaked mercurous chloride, and chitin extracts.

Furthermore, other agents such as softeners, plasticizers, and the like, may also be added at any stage of the polymerization process.

The polymerization catalysts which may be employed in the preparation of my new resins are the acid-acting metallic halides, including acid-acting metallic halide-organic solvent complexes.

Examples of catalysts which may be employed in the polymerization reaction are aluminum chloride, aluminum bromide, stannic chloride, boron trifluoride, boron trichloride, zinc chloride, ferric chloride, and organic solvent complexes of the foregoing metallic halides.

Organic solvent complexes of the metallic halides are formed by adding the halide to the organic solvent followed by stirring. Examples of organic solvents which may be employed are hydrocarbons, such as benzene, toluene, pentene, and decene; ethers, such as diethyl ether, phenyl methyl ether, phenyl ethyl ether, and diisopropyl ether; and esters such as ethyl acetate, amyl acetate, and the like.

The catalyst may be used as such or in admixture, such as with a suitable solvent, to form a suspension, solution or emulsion.

Likewise, the reactants may be employed as such or in admixture such as with a suitable solvent, or with additives such as the coloring materials referred to above.

In order to control more closely the speed and uniformity of the reaction, I may slowly add, with thorough agitation, a solution of the reactants to a suspension, solution or emulsion of the catalyst in an organic solvent. Or, the catalyst may be added to the reactants, or to a solution containing the same.

Examples of suitable solvents or diluents for both catalysts and reactants are benzene, toluene, xylene, solvent naphtha, petroleum naphtha and carbon tetrachloride.

In any event, the addition of one material to the other is preferably accompanied by thorough stirring which is preferably rapid to insure uniform distribution of both materials and temperature.

In addition, the reaction is preferably carried out in apparatus capable of temperature control such as a jacketted vessel provided with an agitator.

The quantity of catalyst may be varied over a rather wide range, although it is found preferable to employ limited quantities such as from 0.1% to 10% by weight of reactants present.

In general, when employing catalysts to polymerize a mixture of indene and piperylene, temperatures between −60 and 145° C. are suitable. I prefer, however, to use temperatures between −40 and 60° C.

The upper limit of permissible temperature is largely determined by (1) the concentration of reactants, (2) the concentration of catalyst, and (3) the reaction time employed. Therefore, if it is found that polymerization conditions are sufficiently drastic to produce an insoluble polymer or gel when a soluble polymer is desired, one or more of the four conditions, namely (1) temperature, (2) concentration of reactants, (3) proportion of catalyst, and (4) reaction time should be reduced until the desired soluble polymer is obtained.

In general, it is preferred to completely remove catalyst from the reaction mass after the desired polymerization is obtained.

Metallic halides, metallic halide-organic solvent complexes and organic peroxides may be removed by any suitable means, such as treating the reaction mass with an alkaline solution followed by thorough washing with water, and filtration.

Contact materials may be removed from the reaction mass by settling, filtration, or centrifuging, or otherwise.

While in the foregoing description reference has not been expressly made to a change in polymerization agent during the polymerization, it is to be understood that a change in polymerization agent during the polymerization step might be resorted to if desired.

I prefer to carry out the polymerization in the presence of an inert and preferably non-catalytic gas, such as carbon dioxide, or nitrogen, or in the presence of solvent vapors, or vapors of the reaction mass, or in a vacuum. In general, the exclusion of air or oxygen from the material during the polymerization process will prevent any possible formation of undesirable compounds, although this step is by no means essential.

Furthermore, while it is preferred to carry out the polymerization with the reactants at least for the most part in the liquid phase, it is to be understood that the reactants might be in the gaseous phase, or partly in the gaseous phase and partly in the liquid phase.

While any proportion of piperylene to indene may be employed in making my new resin, I prefer to employ mixtures containing at least 20% of the minor component.

The properties of the resin obtained is determined in large measure by the relative proportions of the reactants employed.

Thus, the resin obtained by polymerizing a mixture containing 20 parts of piperlyene and 80 parts of indene has a relatively high melting point and is relatively inelastic.

On the other hand, the resin resulting from reacting 80 parts of piperylene with 20 parts of indene has a lower melting point and is somewhat more elastic.

The following example will serve to further illustrate the invention.

EXAMPLE 1

A mixture of 50 parts of indene and 50 parts of piperylene, both in the form of the corresponding light oil fractions, is slowly added to 2% by weight of aluminum chloride-diethyl ether complex, based on the total weight of unsaturated hydrocarbons present, suspended in sufficient toluene to give a solution containing 20% by weight of unsaturated hydrocarbons. The addition is carried out at a temperature of 20° C., and is accompanied by violent agitation. The reaction is continued for a period of 10 hours, after which the catalyst is neutralized by the addition of an aqueous alkaline solution, followed by filtration. Unreacted material is removed by steam under reduced pressure, whereupon there is obtained a light colored, thermoplastic resin in good yield.

Furthermore, while it is preferred to have both the catalyst and the reactant in diluted form, it is to be understood that any other procedure might be followed without departing from the broad concept of the invention. For instance, all of the diluent may be first mixed with either the catalyst or the reactant, or reactants, leaving the other in concentrated form. Or the larger part of the diluent may be added to one, thus leaving the other relatively concentrated. On the other hand, both the catalyst and the reactant or reactants might be employed in concentrated form, particularly if the observations herein with respect to (1) proportion of catalyst, (2) temperature, and (3) reaction time are followed.

It will be understood that any other suitable alkali, such as sodium hydroxide, sodium carbonate, sodium bicarbonate, magnesium hydroxide, an amine or other basic substance might be substituted for lime in the removal of catalyst, preferably followed by a non-acidic drying agent such as sodium sulphate or soda lime. Both neutralizing and drying is effected by lime. Neutralization is preferably followed by filtration, centrifuging or settling to remove extraneous solids.

When a spirit varnish or lacquer is to be prepared from my new resins the reaction mass may be neutralized, clarified, and employed as such, since solvent usually is already present, or other ingredients, such as other solvents, plasticizers, other resinous materials, and the like, may be added. In any event a plastic such as a cellulosic plastic preferably is added to the piperylene-indene resin, or solution thereof, prior to use as a lacquer.

If desired, the solvent employed in the polymerizing step may be replaced, in whole or in part, by another solvent, or mixture of solvents. On the other hand, all solvent present might be removed and the concentrated resin may be employed in the compounding of the desired coating composition.

When my new resins are to be employed in the preparation of coating compositions containing drying oils, it is desirable to remove the solvent from the resin before incorporating it in such coating compositions.

The incorporation of a piperylene-indene resin, prepared as in Example 1 in a standard varnish formulation is illustrated in the following example.

EXAMPLE 2

*Formula*

| | Parts |
|---|---|
| Piperylene-indene resin | 12.2 |
| China-wood oil | 14.0 |
| Solvent naphtha (VM & P) | 26.2 |
| Drier | 1.0 |

*Procedure*

The mixture of resin and China-wood oil is heated to a temperature of 400° F. during a period of 10 minutes. The mixture then is heated to a temperature of 560° F., during a period of five minutes, and held at this temperature for an additional period of one minute. It is allowed to cool to 535° C., held at this temperature until the desired body is obtained, chilled to 400° F., and reduced with solvent naphtha. The drier is stirred into the varnish when it reaches room temperature.

The product is a clear, light-colored varnish with excellent coating properties. It possesses exceptionally good alkali-resisting and dielectric properties.

In place of China-wood oil, other drying oils which may be employed include linseed oil, modified linseed oil, Perilla oil, oiticica oil, dehydrated castor oil, soya bean oil, fish oil, and the like.

The incorporation of a resin of the type described in a standard lacquer is illustrated in the following example.

EXAMPLE 3

A clear cellulosic lacquer may be compounded in the following manner:

| | Parts |
|---|---|
| Piperylene-indene resin | 5 |
| Dibutyl phthalate | 5 |
| One-half second nitrocellulose | 10 |
| Thinner | 40 |

The thinner may have the following composition:

| | Parts |
|---|---|
| Pentacetate | 20 |
| Tertiary amyl alcohol | 10 |
| Isopropyl acetate | 13 |
| Absolute ethyl alcohol | 3 |
| Toluene | 34 |
| Troluoil | 20 |

The lacquer obtained is clear and light in color. When a portion of it is flowed on the surface of a tin panel and permitted to dry for a period of 48 hours, a clear coating film possessing good elastic properties is obtained.

Cellulose ethers, such as ethyl cellulose, as well as other cellulosic plastics, may be substituted for nitrocellulose in the foregoing example.

While I have spoken rather disparagingly of the insoluble type of resin, this is because it is also generally infusible and, therefore, has few if any important uses at the present time. Should an important use develop for a resin which is insoluble and infusible before use my process may likewise be used to obtain this material in good yield by employing drastic conditions as to (1) concentration of reactants, (2) concentration of catalyst, (3) temperature, and (4) reaction time.

My resins differ from rubber in being characterized by having a definite and reproducible softening point and by being compatible with drying oil.

The use of my new resin is by no means restricted to the formation of a single film system. For instance, it may be used as a primer coat for another resinous coating compound of lesser bonding qualities, for example, the polymerized vinyl compounds. This applies particularly in the case of metal food containers. On the other hand, if desired, it may be used as a top coat applied over some other primer coating.

In addition, my resin may be used for coating other materials such as wood, fiber board, asbestos, ceramic ware, concrete, brick, and other building material.

While the invention has been particularly described in connection with the polymerization of indene with piperylene, it is to be understood that indene might be replaced in whole or in part by one or more substituted indenes containing the indene nucleus. However, it is to be understood that the polymers particularly described have certain unique characteristics which distinguish them from polymers prepared from other starting materials.

Examples of substituted indenes are the alkyl, alkyl-aryl, and halogen substituted indenes. Methyl indene is representative of the alkyl substituted indenes, there being seven possible methyl indenes.

The employment of the term "benzene-soluble" in the claims is not intended in any way to mean that benzene is necessarily present, but is only intended to define a characteristic of the material.

It is to be understood that the above particular description is by way of illustration and that changes, omissions, additions, substitutions, and/or modifications might be made within the scope of the claims without departing from the spirit of the invention.

I claim:

1. A process for the production of benzene-soluble copolymer formed preponderantly from piperylene and indene which comprises contacting as the principal reactants present a mixture containing piperylene and indene with 0.1% to 10% by weight of the total reactants of an acid-acting metallic halide catalyst at a temperature between −60 and 145° C., and recovering benzene-soluble resinous copolymer of piperylene and indene.

2. A process for the production of benzene-soluble resinous copolymer formed preponderantly from indene and piperylene which comprises contacting a light oil piperylene fraction boiling mainly in the range of 38 to 45° C. with a light oil indene fraction boiling mainly in the range of 178 to 185° C. at a temperature between −40 and 60° C. in the presence of 0.1% to 10% by weight of reactants of an acid-acting metallic halide polymerization catalyst, said piperylene and indene being the preponderating reactants present, and recovering benzene-soluble resinous copolymer of indene and piperylene.

3. A process for the production of benzene-soluble resinous copolymer formed preponderantly from indene and piperylene which comprises contacting a light oil piperylene fraction boiling mainly in the range of 38 to 45° C. with a light oil indene fraction boiling between 178° to 185° C. at a temperature between −40 and 60° C. in the presence of from 0.1% to 10% by weight of reactants of an acid-acting metallic halide-organic solvent complex, said piperylene and indene being the preponderating reactants present, and recovering benzene-soluble resinous copolymer of indene and piperylene from the reaction mixture.

4. A benzene-soluble resinous product resulting from the catalytic copolymerization with the aid of an acid-acting metallic halide catalyst of unsaturated hydrocarbon material selected from the group consisting of indene and methyl indene with unsaturated hydrocarbon material selected from the group consisting of piperylene and catalytically partially polymerized piperylene, said selected unsaturated hydrocarbon material being the preponderant reacting material present, and said copolymerization being effected at a polymerizing temperature below 145° C. while maintaining the concentration of catalyst present in the reaction mixture between 0.1% and 10% by weight of the total reactants present, said partially polymerized piperylene having been produced under similar polymerization conditions from hydrocarbon material containing piperylene as the preponderant unsaturation thereof, and said product being characterized by being compatible with drying oil.

5. A benzene-soluble resinous product resulting from copolymerizing as the principal reactants present catalytically partially polymerized piperylene and indene, said copolymerization being effected by means of an acid-acting metallic halide catalyst at a temperature between −60 and 145° C., while maintaining the quantity of catalyst present in the reaction mixture between 0.1% and 10% by weight of the total reactants, said partially polymerized piperylene having been previously produced under similar polymerization conditions from hydrocarbon material containing piperylene as the preponderant unsaturation present, said product being characterized by being compatible with drying oil.

6. A benzene-soluble resinous product formed mainly from indene and piperylene and produced by the copolymerization of a light oil indene fraction containing indene as the predominating reactive material with a light oil piperylene fraction containing piperylene as the predominating active material, said copolymerization being effected at a temperature between −40 and 60° C., and in the presence of from 0.1% to 10% by weight of the total reactants of an acid-acting metallic halide catalyst, said product being characterized by being compatible with drying oil.

7. A benzene-soluble resinous product formed mainly from indene and piperylene and produced by the copolymerization of from 50 to 99% of piperylene with from 1 to 50% of indene, said copolymerization being effected at a temperature between −40 and 60° C. in the presence of from 0.1% to 10% by weight of the total reactants present of an acid-acting metallic halide catalyst, said product being characterized by being compatible with drying oil.

8. A benzene-soluble resinous product formed mainly from indene and piperylene and produced by the catalytic copolymerization of a mixture of indene and piperylene, said mixture containing at least 20% of indene, said copolymerization being effected at a temperature between −40 and 60° C. in the presence of from 0.1% to 10% by weight of the total reactants present of an acid-acting metallic halide catalyst, said product being characterized by being compatible with drying oil.

9. A benzene-soluble resinous product formed mainly from indene and piperylene and produced by the catalytic copolymerization of a mixture of indene and piperylene, said mixture containing at least 20% of piperylene, said copolymerization being effected at a temperature between −40 and 60° C. in the presence of from 0.1% to 10% by weight of the total reactants present of an acid-acting metallic halide catalyst, said product being characterized by being compatible with drying oil.

FRANK J. SODAY.